United States Patent
Roy et al.

(10) Patent No.: US 9,053,029 B2
(45) Date of Patent: Jun. 9, 2015

(54) MULTICORE COMPUTER SYSTEM WITH CACHE USE BASED ADAPTIVE SCHEDULING

(75) Inventors: Shaibal Roy, Kamuela, HI (US); Soumya Datta, Kolkata, IN (US)

(73) Assignee: EMPIRE TECHNOLOGY DEVELOPMENT LLC, Wilmington, DC (US)

( * ) Notice: Subject to any disclaimer, the term of this patent is extended or adjusted under 35 U.S.C. 154(b) by 154 days.

(21) Appl. No.: 13/702,547

(22) PCT Filed: Feb. 6, 2012

(86) PCT No.: PCT/US2012/023923
§ 371 (c)(1),
(2), (4) Date: Dec. 6, 2012

(87) PCT Pub. No.: WO2013/119195
PCT Pub. Date: Aug. 15, 2013

(65) Prior Publication Data
US 2013/0205092 A1    Aug. 8, 2013

(51) Int. Cl.
*G06F 12/08* (2006.01)
*G06F 9/52* (2006.01)
*G06F 9/54* (2006.01)

(52) U.S. Cl.
CPC ............ *G06F 12/084* (2013.01); *G06F 9/52* (2013.01); *G06F 9/544* (2013.01)

(58) Field of Classification Search
CPC ............ G06F 12/084; G06F 12/0862; G06F 12/0842; G06F 9/4881; G06F 2201/88; G06F 2201/885; G06F 2212/1016
See application file for complete search history.

(56) References Cited

U.S. PATENT DOCUMENTS

| | | | |
|---|---|---|---|
| 7,430,639 B1 * | 9/2008 | Bali et al. | 711/133 |
| 2004/0022094 A1 * | 2/2004 | Radhakrishnan et al. | 365/200 |
| 2006/0143384 A1 | 6/2006 | Hughes et al. | |
| 2008/0059712 A1 * | 3/2008 | Fedorova | 711/130 |
| 2008/0320235 A1 | 12/2008 | Beckmann et al. | |
| 2009/0006755 A1 | 1/2009 | Illikkal et al. | |
| 2009/0198907 A1 * | 8/2009 | Speight et al. | 711/137 |
| 2010/0268900 A1 * | 10/2010 | van Riel | 711/154 |
| 2011/0055479 A1 * | 3/2011 | West et al. | 711/118 |
| 2011/0066808 A1 * | 3/2011 | Flynn et al. | 711/118 |

(Continued)

FOREIGN PATENT DOCUMENTS

WO    PCT/US12/23923    2/2012

OTHER PUBLICATIONS

International Searching Authority, International Search Report and Written Opinion of the International Searching Authority for PCT/US12/23923, May 23, 2012.

(Continued)

*Primary Examiner* — Aimee Li
*Assistant Examiner* — Jason Blust
(74) *Attorney, Agent, or Firm* — Jensen & Puntigam, PS

(57) ABSTRACT

An example multicore environment generally described herein may be adapted to improve use of a shared cache by a plurality of processing cores in a multicore processor. For example, where a producer task associated with a first core of the multicore processor places data in a shared cache at a faster rate than a consumer task associated with a second core of the multicore processor, relative task execution rates can be adapted to prevent eventual increased cache misses by the consumer task.

25 Claims, 8 Drawing Sheets

(56) References Cited

U.S. PATENT DOCUMENTS

2011/0113199 A1   5/2011   Tang et al.
2011/0231857 A1*  9/2011   Zaroo et al. .................. 718/104
2013/0054897 A1*  2/2013   Flemming et al. ............ 711/122
2013/0124826 A1*  5/2013   Merchant et al. ............. 712/205

OTHER PUBLICATIONS

James H. Anderson et al.; "Real-Time Scheduling On Multicore Platforms"; Journal University of North Carolina; Oct. 2005; 12 pages; US.
Samuel K. Moore; "Multicore Is Bad News For Supercomputers"; IEEE Spectrum magazine; Nov. 2008; 2 pages; US.
Alexandra Fedorova et al.; "Cache-Fair Thread Scheduling for Multicore Processors"; Journal Harvard University; 2006; 12 pages; US.
David C. Steere et al.; "A Feedback-driven Proportion Allocator for Real-Rate Scheduling"; Journal, Oregon Graduate Institute; 1998; 14 pages; US.
Nesbit, K. J., and Smith, J. E., "Data Cache Prefetching Using a Global History Buffer," HPCA '04 Proceedings of the 10th International Symposium on High Performance Computer Architecture, pp. 1-10, (Feb. 14, 2004).
Phalke, V., and Gopinath, B., "A miss history-based architecture for cache prefetching," Memory Management Lecture Notes in Computer Science, vol. 986, pp. 381-398, (1995).

* cited by examiner

MULTICORE COMPUTER SYSTEM WITH CACHE USE BASED ADAPTIVE SCHEDULING

CROSS-REFERENCE TO RELATED APPLICATION

The present application is a U.S. national stage application under 35 U.S.C. §371 of PCT Application No. PCT/US12/23923, entitled MULTICORE COMPUTER SYSTEM WITH CACHE USE BASED ADAPTIVE SCHEDULING, filed on Feb. 6, 2012, which is incorporated herein by reference in its entirety.

BACKGROUND

Unless otherwise indicated herein, the materials described in this section are not prior art to the claims in this application and are not admitted to be prior art by inclusion in this section.

Multicore computing systems, including for example dual- and quad-core computing systems, are now commercially available. Multicore technologies are recognized as an important aspect of the future of computing. However a variety of significant multicore design challenges remain to be overcome. For example, while small processor sizes, powerful processing speeds, and low manufacturing costs allow for inexpensively placing large total processing power on a single multicore chip, challenges remain in harnessing such processing power through effective collaboration of the various cores.

SUMMARY

The present disclosure describes a multicore computer system with cache use-based adaptive scheduling, and includes aspects such as a cache controller for a shared cache in such a multicore computer system, a scheduler configured to optimize performance of tasks in a multicore computer system, and methods and computer readable media optimizing shared cache use in a multicore computer system.

Some example multicore computer systems may include a first core and a second core, and may further comprise a shared cache, a counter configured to count just-missed misses by the first core, wherein the just-missed misses include cache misses associated with data recently evicted from the shared cache, and a scheduler configured to, in response to an increase in the just-missed misses counted by the counter, adjust an execution rate of a task associated with the first core relative to an execution rate of a task associated with the second core.

Some example cache controllers for a shared cache that is operated with a multicore computer system may comprise a list of cache line addresses associated with data recently evicted from the shared cache, and a plurality of counters. Each counter may be associated with one of the cores of the multicore computer system, and each counter may be configured to count a just-missed miss when an associated core requests the data recently evicted from the shared cache. Counter values of each of the plurality of counters may be retrievable from the cache controller and resettable by the cache controller upon request to the cache controller.

Some example schedulers may be configured to optimize performance of tasks in a multicore computer system including a first core and a second core, each core associated with a task, and each core configured to access a shared cache. A scheduler may comprise a cache controller interface configured to receive a count of just-missed misses associated with the first core, wherein the just-missed misses include cache misses associated with data recently evicted from the shared cache. The scheduler may further comprise a prevention policy generator configured to, in response to an increase in the count of just-missed misses received at the cache controller interface, adjust an execution rate of a first task associated with the first core relative to an execution rate of a second task associated with the second core.

Some example computer readable media may have computer executable instructions that, when executed, configure a scheduler to optimize performance of tasks in a multicore computer system, wherein the multicore computer system includes a first core and a second core of a multicore processor, each core associated with a task, and each core accessing a shared cache. The computer executable instructions may comprise instructions for receiving a count of just-missed misses associated with the first core, wherein the just-missed misses include cache misses associated with data recently evicted from the shared cache, and instructions for generating a prevention policy in response to an increase in the count of just-missed misses received at the cache controller interface, wherein the that prevention policy adjusts an execution rate of a first task associated with the first core relative to an execution rate of a second task associated with the second core.

Some example methods for optimizing shared cache use in a multicore computer system including a first core and a second core may comprise accumulating, by a plurality of counters, counts of shared cache just-missed misses by a plurality of cores in a multicore computer system. The just-missed misses include cache misses associated with data recently evicted from the shared cache. A method may further comprise receiving, by a scheduler, one or more counts associated with a counter and also associated with the first core, detecting, by the scheduler, an increase in just-missed misses associated with the first core based at least in part on the one or more counts received by the scheduler, and adjusting, by the scheduler, in response to the detecting an increase in just-missed misses associated with the first core, an execution rate of a task associated with the first core relative to an execution rate of a task associated with a second core.

Some example methods for optimizing use of a shared cache in a multicore computer system including a first core and a second core may comprise requesting a cache controller to count shared cache just-missed misses associated with the first core, wherein the just-missed misses include cache misses associated with data recently evicted from the shared cache, counting the shared cache just-missed misses associated with the first core, providing a count of shared cache just-missed misses associated with the first core to a scheduler, and adjusting an execution rate of a task associated with the first core relative to an execution rate of a task associated with a second core.

Some example methods for optimizing use of a shared cache in a multicore computer system including a first core and a second core may comprise monitoring a rate of shared cache just-missed misses associated with the first core, determining when the rate of just-missed misses associated with the first core enters a predetermined range, and when the rate of just missed misses is determined to enter the predetermined range, adjusting an execution rate of a first task associated with the first core relative to an execution rate of a second task associated with the second core.

Some example computer readable media may have computer executable instructions for optimizing use of a shared cache in a multicore computer system comprising a first core and a second core. The computer executable instructions may comprise instructions for monitoring a rate of shared cache just-missed misses associated with the first core, instructions for determining when the monitored rate of shared cache just-missed misses is in a predetermined range, and instructions for adjusting an execution rate of a first task associated with the first core relative to an execution rate of a second task associated with the second core when the monitored rate is determined to be in the predetermined range.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
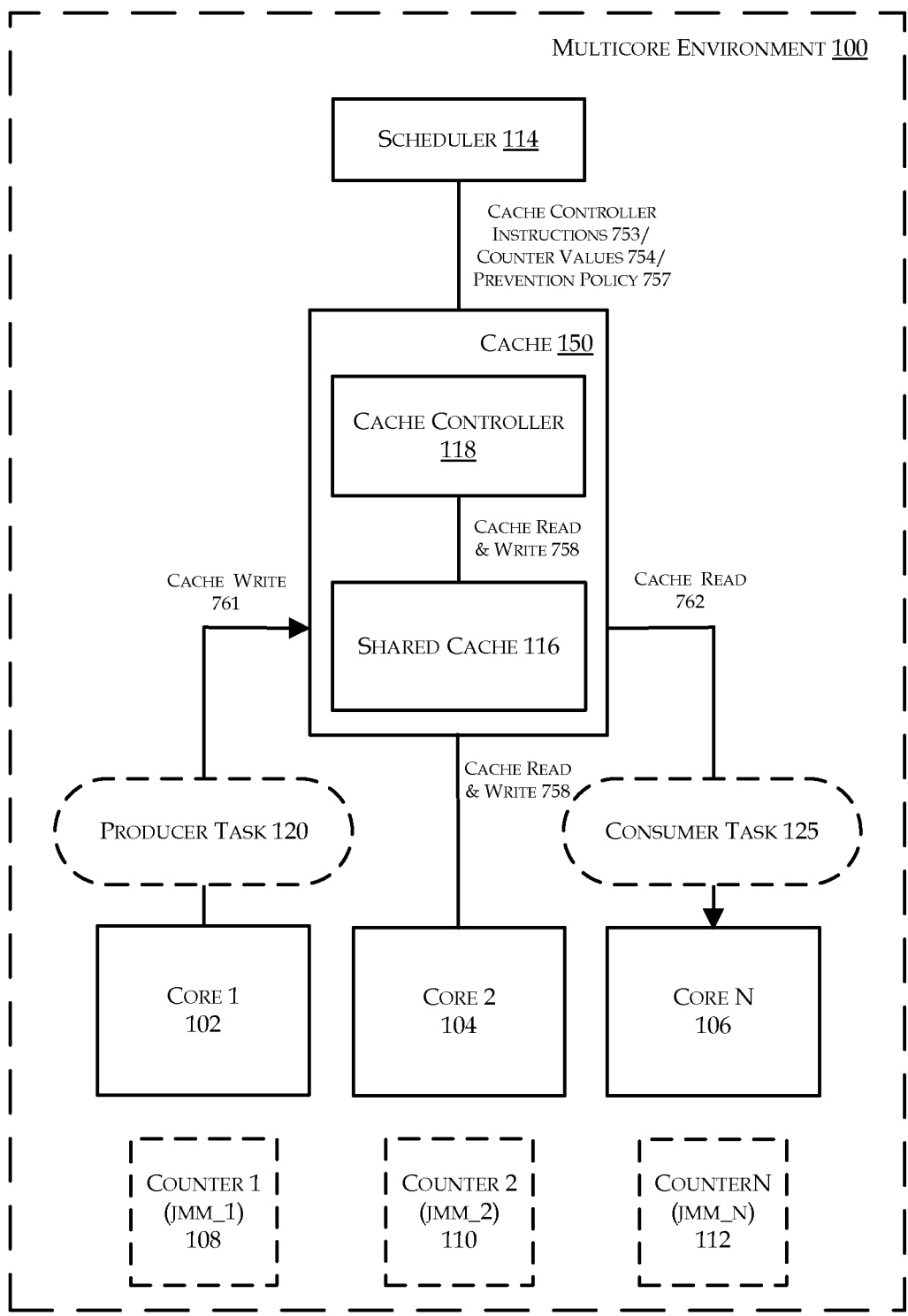
FIG. 1 is a block diagram illustrating an example multicore environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to methods, devices, and/or systems related to improved use of a shared cache by a plurality of processing cores in multicore environments. For example, where a producer task associated with a first core places data in a shared cache at a faster rate than a consumer task associated with a second core, relative task execution rates can be adapted to prevent eventual increased cache misses by the consumer task.

FIG. 1 is a block diagram illustrating an example multicore environment 100 arranged in accordance with at least some embodiments of the present disclosure. Multicore environment 100 may comprise a scheduler 114, a cache 150, and a plurality of cores such as core 102, core 104, and core 106 (or Core 1-N). Cache 150 may comprise a cache controller 118 and a shared cache 116. Counters 108, 110, and 112 (or Counter 1-N) may be associated with each of cores 102, 104, 106 respectively, as suggested by the dashed lines around each of counters 108, 110, 112, and the locations of counters 108, 110, 112 beneath corresponding cores 102, 104, 106. Counters 108, 110, 112 may be configured to count "Just Missed Misses" (JMM) for each of the corresponding cores 102, 104, 106. Furthermore, a producer task 120 may for example be associated with core 102, and a consumer task 125 may be associated with core 106, as suggested by the locations of tasks 120, 125 above cores 102, 104 respectively and dashed lines around tasks 120 and 125.

In FIG. 1, the various couplings between components may be implemented via bus and interface connections as described in connection with FIG. 2. Scheduler 114 and cache 150 may be configured to exchange data and/or commands comprising, for example, cache controller instructions 753, counter values 754, and/or a prevention policy 757. Cache controller 118 and shared cache 116 may be configured to exchange data and/or commands comprising, for example, cache read and/or write data and instructions 758.

Cores 102, 104, 106 may be configured to exchange cache read and/or write data and instructions 758 with the cache 150, as shown by the example cache read and/or write data and instructions 758 exchanged between core 102 and cache 150. Cache controller 118 and shared cache 116 may be configured to exchange cache read and/or write data and instructions 758 to read and/or write data to shared cache 116 per requests of the various cores 102, 104, 106. Core 102 and producer task 120 may for example be configured to request cache 150 to perform cache write operations 761. An arrow pointing from core 102 and producer task 120 to cache 150 indicates that cache write operations 761 may comprise data that is written into the cache 150.

Core 106 and consumer task 125 may for example be configured to request cache 150 to perform cache read operations 762. An arrow pointing from cache 150 to consumer task 125 and core N 106 indicates that cache read operations 762 may comprise data being read from the cache 150.

FIG. 1 illustrates a scenario in which data may be written to the shared cache 116 by a producer task 120 associated with a first core 102 in one or more cache write 761 operations. The data written by the producer task 120 may be read by a consumer task 125 associated with core 106, in one or more cache read 762 operations. One example scenario may comprise, for example, decrypting and uncompressing data that is both compressed and encrypted. In this scenario, two operations may be performed: first, the compressed, encrypted data may be decrypted to produce compressed, decrypted data. Second, the compressed, decrypted data may be uncompressed. The producer task 120 may for example perform the first operation, decrypting data and writing the compressed, decrypted data to the shared cache 116. The consumer task 125 may for example perform the second operation, uncompressing the compressed, decrypted data by reading the compressed, decrypted data from the shared cache 116 and uncompressing the compressed, decrypted data.

In multicore environments such as 100, use of a shared cache 116 may become less than optimal if a "memory wall" scenario develops. A memory wall may be understood as follows: if the producer task 120 races too far ahead of the consumer task 125, shared cache 116 may overflow. Shared cache 116 overflow may be defined as data being evicted from shared cache 116 by cache controller 118 before the evicted data is read by consumer task 125. The evicted data may for example be moved to another more remote memory location, such as a Random Access Memory (RAM) system memory (not shown), or a hard disk (not shown). When consumer task 125 attempts a cache read 762 of the evicted data, a cache miss may result, and the consumer task 125 may instead retrieve the evicted data from the more remote memory location. Retrieval from the more remote memory location may take more time than retrieval from shared cache 116, and as a result, the consumer task 125 may fall further behind the producer task 125. Additional data written to the shared cache 116 by producer task 120 may be evicted prior to use by consumer task 125, and the use of the shared cache 116 in the multicore environment 100 thereby becomes less than optimal. Locality of references via utilization of a shared cache 116 affects the performance of a multi-core environment 100, because it is generally faster to retrieve desired data from a shared cache 116 that it would be to retrieve desired data from other memory locations.

As will be described further in connection with the various other figures and description herein, the multicore environment 100 may be adapted to prevent the above described memory wall scenario. Adaptations of multicore environment 100 may comprise, inter alia, modifications to the cache controller 118 that can facilitate collection of cache utilization data, and modifications to the scheduler 114 that can facilitate collection, analysis, and response to the cache utilization data collected by the cache controller 118.

In some embodiments, collected cache utilization data may comprise JMM data. JMM data may provide an indicator of how many cache misses associated with a particular core 102, 104, 106 may be characterized as "just missed". JMM data may comprise counts of cache misses corresponding to data that was recently evicted from the shared cache 116. Of course, "recently evicted", for the purpose of determining JMM data, may be defined in a variety of different ways. An example definition of a JMM data may comprise: a cache miss on an n-way set associative cache if and only if (iff) the requested data is among the last n/2 cache lines to be discarded from a line of the cache. Those of skill in the art will recognize with the benefit of this disclosure that there may be numerous other acceptable ways to define JMM data. Multicore environment 100 may be configured to collect and utilize JMM data as described herein.

In FIG. 1, the scheduler 114 may be configured to provide cache controller instructions 753 to the cache controller 118. Cache controller instructions 753 may allow the scheduler 114 to request counter values 754 from the cache controller 118. Counter values 754 may comprise JMM data associated with the various cores 102, 104, 106. Cache controller 118 may in turn be configured to collect counter values 754, as described further below.

The scheduler 114 may be configured to detect, based on retrieved counter values 754, whether a preventable memory wall problem may occur. The scheduler 114 may be further configured to generate and deploy a prevention policy 757 to prevent a detected memory wall risk. A prevention policy 757 may be configured to modify relative execution rates of the tasks 120, 125, thereby effecting the memory wall prevention. The prevention policy 757 may comprise any of a variety of actions, including for example context switches to provide the producer task 120 with less execution time (this is one approach for throttling producer task) and/or providing the consumer task 125 with more execution time or other resources. The prevention policy 757 may also comprise, inter alia, cache use policy modifications, modifications of task priority settings, and various techniques for throttling a producer task. The prevention policy 757 may be implemented by direct interaction between the scheduler 114 and the cores 102, 106, or may be implemented by communicating the prevention policy 757 to the cache controller 118, allowing the cache controller 118 to enforce the prevention policy 757.

The cache controller 118 may be configured to manage the shared cache 116 in a traditional manner in some embodiments. In addition, the cache controller 118 may be configured to start, increment, and reset the counters 108, 110, 112. The cache controller 118 may also be configured to provide counter values 754 to the scheduler 114 upon request by the scheduler 114, and to enforce a prevention policy 757 received from the scheduler 114.

In some embodiments, the counters 108, 110, 112 may be dedicated special function registers (SFRs). Furthermore, it should be emphasized that shared cache 116 may comprise a shared cache of any level, e.g., a level two (L2) cache or a level three (L3) cache. The shared cache 116 may be implemented with a ring buffer, or using any of the various available or future developed shared cache technologies.

Figure 2:
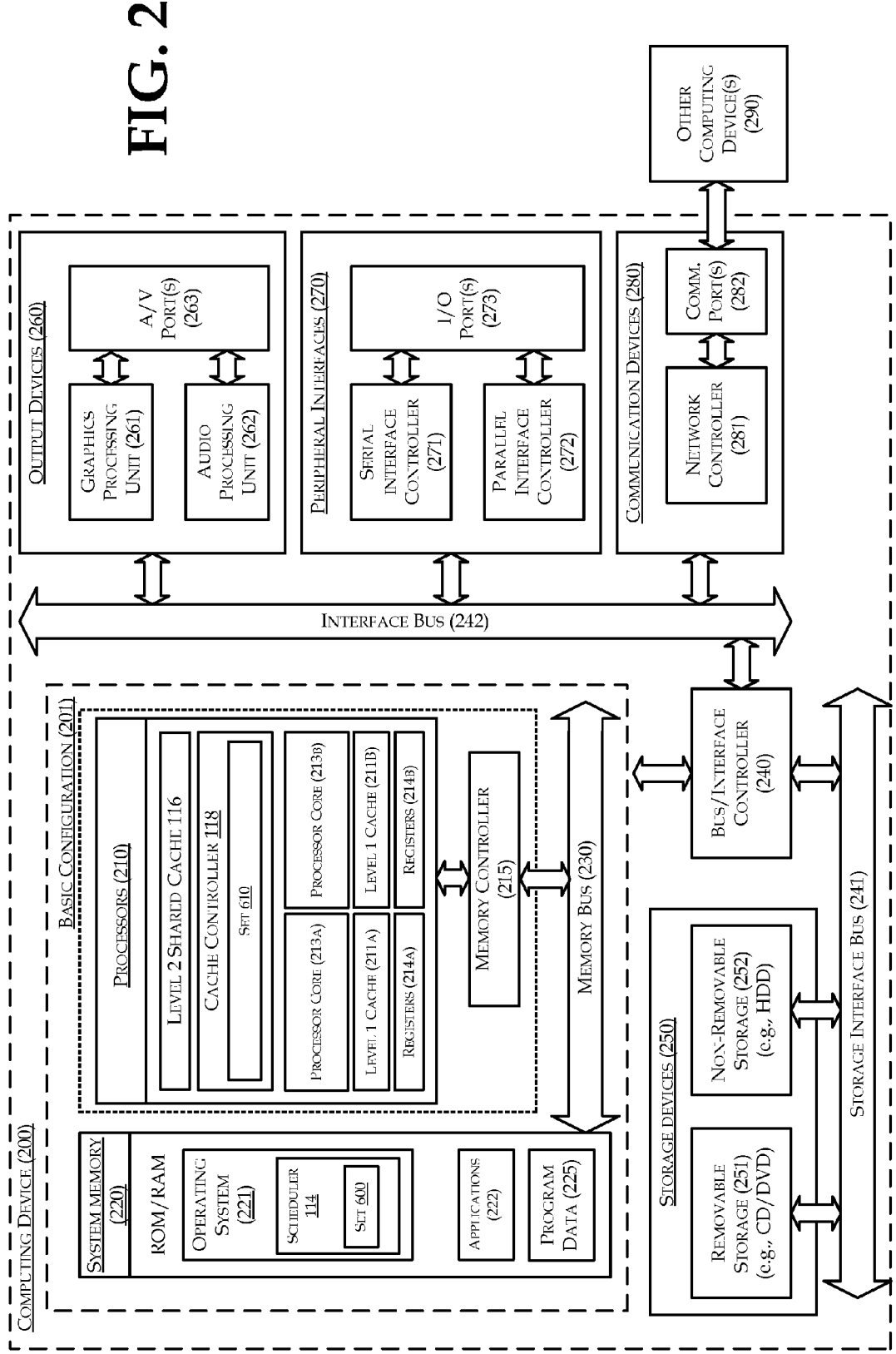
FIG. 2 is a block diagram illustrating an example computing device that can implement a multicore environment

FIG. 2 is a block diagram of an example computing device 200 that can implement a multicore environment (e.g. multicore environment 100 in FIG. 1), arranged in accordance with at least some embodiments of the present disclosure. In a very basic configuration 201, computing device 200 may include processors 210 comprising a plurality of processor cores 213A, 213B and system memory 220. A memory bus 230 may be used for communicating between the processors 210 and the system memory 220.

Depending on the desired configuration, processors 210 may comprise two or more processor cores 213A, 213B. Processor cores 213A, 213B may comprise any processor types including but not limited to microprocessors (µP), microcontrollers (µC), digital signal processors (DSP), or any combination thereof. Processors 210 may include one or more levels of caching, such as level one caches 211A, 211B and a level two shared cache 116 controlled by a cache controller 118. In some embodiments, cache controller 118 may comprise a set of components 610, discussed in connection with FIG. 6. Cache controller 118 may further comprise aspects of a cache controller described in connection with FIG. 8. Cache 116 and cache controller 118 may also correspond to a shared any-level cache, such as, for example a level three cache. Processors 210 may also comprise registers 214A, 214B. Each of the processor cores 213A, 213B may include an arithmetic logic unit (ALU), a floating point unit (FPU), a digital signal processing core (DSP Core), or any combination thereof. A memory controller 215 may also be used with the processors 210, or in some implementations the memory controller 215 may be an internal part of the processors 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 225. Operating system 221 may include, for example, scheduler module(s) 114 introduced in connection with FIG. 1, which may comprise a set of components 600 discussed in connection with FIG. 6. Scheduler module(s) 114 may further comprise aspects of a scheduler described in connection with FIG. 7.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more AN ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. Computing device 200 may also be implemented as a personal computer including both laptop computer and non-laptop computer configurations.

Figure 3:
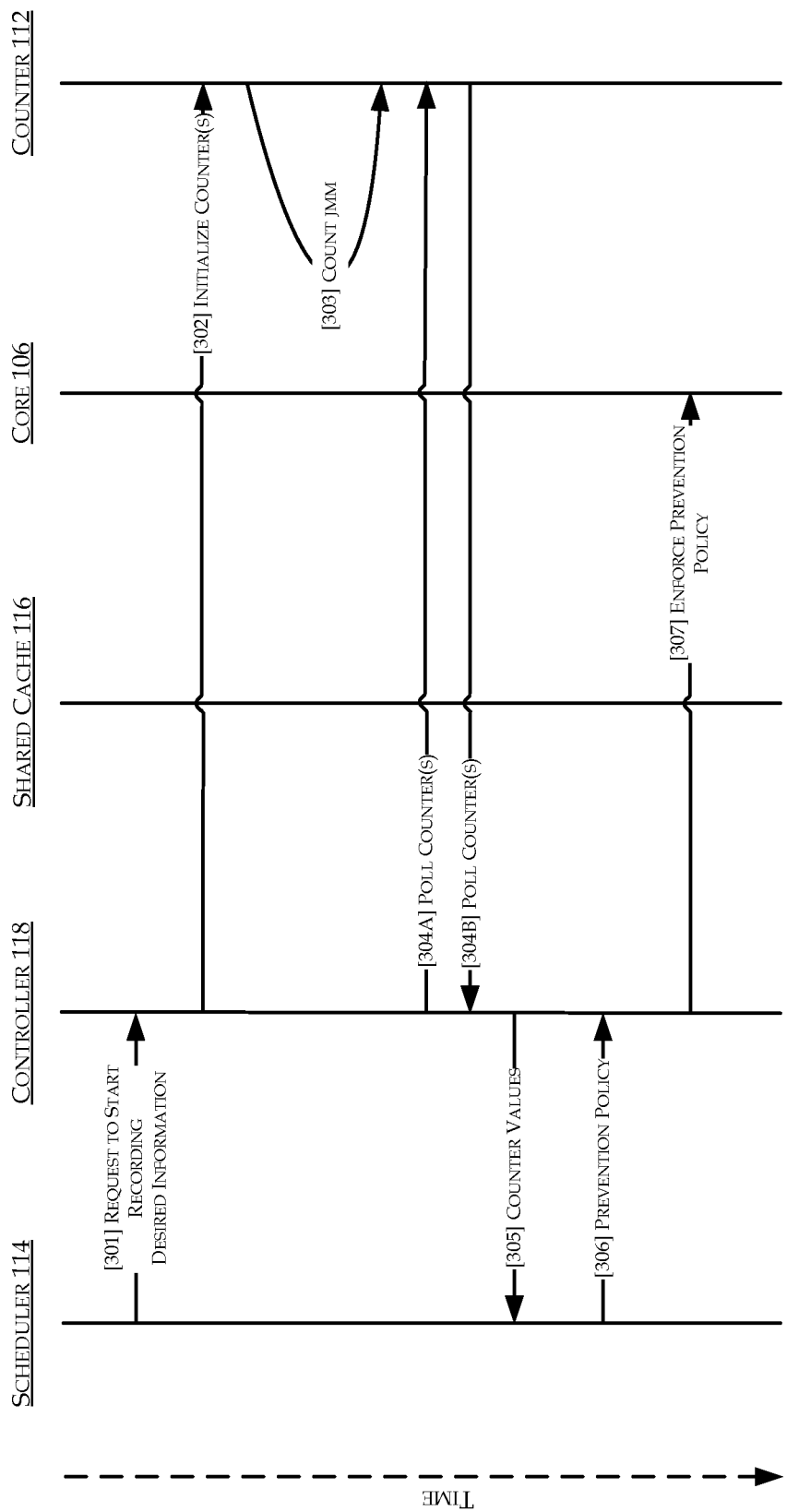
FIG. 3 is a state diagram corresponding to components of FIG. 1.

FIG. 3 is a state diagram corresponding to components of FIG. 1, arranged in accordance with at least some embodiments of the present disclosure. FIG. 3 includes scheduler 114, controller 118, shared cache 116, an example core 106, and an example counter 112 corresponding to core 106; all across the top of the figure with vertical lines underneath each of the listed components representing time progressing for operation of each component.

FIG. 3 also illustrates a plurality of example operations as may be performed by the listed components. The operations are represented by arrows between the vertical lines corresponding to the illustrated components. Example operations may include one or more of operations 301-307. Operation 301, "request to start recording desired information", may be initiated by scheduler 114 to controller 118. In response to the request from operation 301, controller 118 may initiate operation 301, "initialize counters", where controller 118 interacts with counter 112 to initialize counter 112 to some start value (e.g., reset to a zero count, or some other predetermined count). Operation 302 may be followed by operation 303, "count JMM", where counter 112 may be updated to reflect a number of JMMs for shared cache 116. The JMMs counted in counter 112 may for example correspond to JMMs for a particular core 106 or set of cores. Operation 303 may be followed in time by operations 304A and 304B, "poll counters", which may be initiated by controller 118 to counter 112 in operation 304A, so that the counter value of counter 112 can be returned from counter 112 to controller 118 in operation 304B. Operation 304B may be followed in time by operation 305, "counter values", where the controller 118 can transfer a counter value obtained from counter 112 to scheduler 114. Operation 305 may be followed in time by operation 306, "prevention policy", which can be initiated by scheduler 114 to controller 118. Operation 306 may be followed in time by operation 307, "enforce prevention policy", which can be initiated by controller 118 to core 106.

In operation 301, the scheduler 114 may be configured to command the cache controller 118 to start recording desired information, namely, the number(s) of JMM for one or more cores. The command may identify core(s), task(s), and/or counter(s), and may include an instruction to reset the counter to zero, initialize the counter to a predetermined count, and/or start the counter(s). The command may be implemented in the scheduler 114 for example via an Application Programming Interface (API) type command, or for example via a machine instruction for the cache controller 118. In some embodiments, the scheduler 114 may be configured to send the command of operation 301 in response to a detected performance change for a particular task or core, e.g., a slow-down of a consumer task. In some embodiments, the scheduler 114 may be configured to send the command of operation 301 in response to another event, such as detection of a context switch to a particular task, e.g. a consumer task for which memory wall problems frequently arise. In some embodiments, the command may identify when to stop counting and/or return counter value(s). For example, an API that supports instructions relating to future actions, e.g., actions at future times and/or upon occurrence of specified events, may be implemented in the scheduler and/or cache controller. One example API is the WINDOWS EVENTING® API; however a variety of other technologies may also be used as will be appreciated. Operation 301 may be followed by operation 302.

In operation 302, the cache controller 118 may be configured to set one or more counters (such as example counter 112) identified in the scheduler command of operation 301 to an initial value. The initial value may be zero or may be non-zero. Operation 302 may be followed by operation 303.

In operation 303, a counter 112 may be configured to be incremented with each JMM by a core 106 associated with the counter 112. The counter 112 may be incremented by a variety of mechanisms, including, for example, by a cache controller 118 configured to implement a counter 112, or by a discrete module of a cache controller 118 as discussed in connection with FIG. 8. The counter 112 may be configured to be incremented upwards or downwards in some embodiments. In various embodiments, JMM detection may be performed for example using a JMM list maintained by the cache controller 118, as will be discussed further herein. Operation 303 may be followed by operation 304A.

In operations 304A and 304B, the cache controller 118 may be configured to poll the counter 112 to obtain a JMM count number associated with the counter 112. In some embodiments, the cache controller 118 may be configured to poll the counter 112 at a selected interval after the counter 112 was started. The selected interval may correspond to a time interval or an interval based on volume of shared cache operations, or an interval measured by any other relevant property. In some embodiments, the cache controller 118 may be configured to poll the counter in response to a command (not shown) from the scheduler 114, or in accordance with the command of operation 301. In some embodiments, the counter or a JMM manager as discussed herein may be configured provide a counter value to the cache controller 118 without polling, for example when a predetermined counter threshold value is reached. In some embodiments, operations 304A and/or 304B may be combined with operation 305, discussed below, and may comprise for example an interaction directly between the scheduler 114 and the counter 112. In some embodiments, interrupts may be generated at the counter 112, e.g., in response to a count change. For example, communications analogous to operation 304A may be eliminated, as an interrupt need not include any request for information on the part of the controller 118. Instead, an interrupt communication analogous to operation 304B may be performed. Operation 304B may be followed by operation 305.

In operation 305, the cache controller 118 may be configured to provide counter values to the scheduler 114. The scheduler 114 may be configured to use provided counter values to detect and prevent memory wall problems with respect to the shared cache 116. In some embodiments, the scheduler 114 may be configured to perform memory wall detection based on comparing provided counter value(s) to one or more selected threshold values. For example, a first threshold JMM count and a second threshold JMM count may be selected in the scheduler 114. If a provided counter value is between the first and second thresholds, then the scheduler 114 may be configured to deem a potential memory wall problem sufficiently likely to justify formulation and/or deployment of a prevention policy by the scheduler 114.

In embodiments in which a counter is incremented upwards, a threshold may be set at a selected counter value, or may be set at a counter overflow, e.g., a max counter count plus one, which may in some embodiments be detected by a counter value sign change. In embodiments in which a counter is incremented downwards, a threshold may also be set at a selected counter value, or may be set at a counter underflow, e.g., a count of zero minus one, which may in some embodiments be detected by a counter value sign change. Operation 305 may be followed by operation 306.

Figure 4:
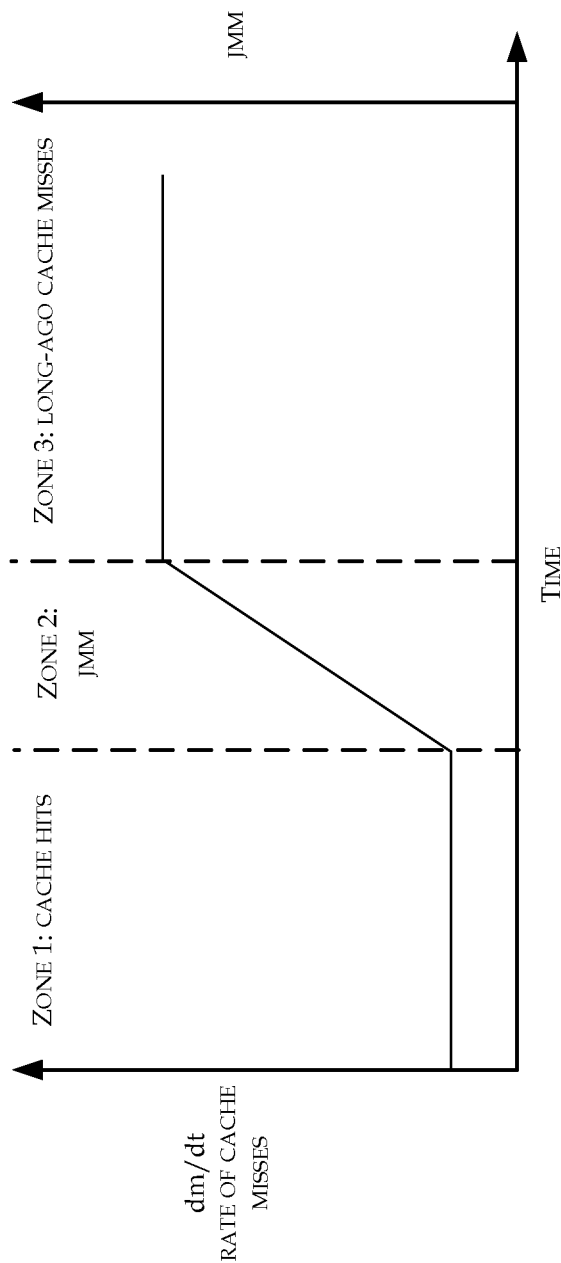
FIG. 4 is a graph illustrating example changes in cache hit and miss zones as may correspond to a core in a multicore environment.

In operation 306, the scheduler 114 may be configured to provide a prevention policy to the cache controller 118. The prevention policy may comprise any policy for preventing a memory wall problem. In some embodiments, the prevention policy can throttle a producer task cache data production rate and increase a consumer task cache data consumption rate using for example context switching in corresponding cores. The prevention policy may also comprise otherwise providing more or fewer resources to a producer or consumer task. In some embodiments, the prevention policy may be based on cache use data, such as the value of a JMM count or rate of change of a JMM count as compared to one or more previous JMM counts. For example, prevention policy may vary depending on zone determinations made according to zone divisions as illustrated in FIG. 4, as discussed further below. In some embodiments, the prevention policy may bypass the controller 118 and may instead be provided to one or more cores such as example core 106, as discussed further in connection with FIG. 7. Operation 306 may be followed by operation 307.

In operation 307, the cache controller 118 may be configured to enforce a prevention policy provided by the scheduler 114. In some embodiments, the cache controller 118 may be configured to forward prevention policy information to a core 106. In various embodiments, the cache controller 118 may be configured to modify cache use policies corresponding to particular cores or tasks, to slow down or speed up execution of those tasks. In some embodiments, the cache controller 118 may increase or decrease priority of particular cores or tasks. In general, the cache controller 118 may take any action to modify the relevant execution rates of tasks involved in a potential memory wall scenario as may be identified in the prevention policy provided by the scheduler 114.

FIG. 4 is a graph illustrating example changes in cache hit and miss zones as may correspond to a core in a multicore environment, in accordance with at least some embodiments of the present disclosure. FIG. 4 illustrates a horizontal time axis, a left side vertical axis corresponding to a rate of cache misses (denoted as dm/dt, where m denotes a cache miss and t denotes time), and a right side vertical axis corresponding to numbers of JMM.

FIG. 4 shows three zones between the left and right vertical axes. A leftmost zone 1, "cache hits" is characterized by a low horizontal line indicating few JMM and a low rate dm/dt. A central zone 2, "JMM" is characterized by a line rising steeply from left to right, indicating an increasing total number of JMM over time, and also an increase in the rate dm/dt. A rightmost zone 3, "long ago cache misses" is characterized by a high horizontal line indicating many JMM and a high rate dm/dt.

In zone 1, the measured core experiences mostly cache hits. This corresponds to a desirable situation where desired data is stored in a cache prior to request for such data by the core. In some embodiments, where a scheduler 114 requests a JMM count from a cache controller 118, and the cache controller provides a JMM count indicating total cache miss numbers, JMM counts, and/or dm/dt values indicating the measured core and/or task falls in zone 1, the scheduler 114 may for example be configured not to deploy a prevention policy unnecessarily under these circumstances.

In zone 2, the measured core experiences increasing JMM and/or dm/dt. This may correspond to a preventable memory wall scenario. The measured core is beginning to experience cache misses. In zone 2, these cache misses may be identified as just-missed because the cache misses have occurred recently and the pointers to this data may be still accessible. In some embodiments, where a scheduler 114 requests a JMM count from a cache controller 118, and the cache controller provides a JMM count indicating total cache miss numbers, JMM counts, and/or dm/dt values indicating the measured core and/or task falls in zone 2, the scheduler 114 may for example be configured to deploy a prevention policy to prevent a memory wall problem from occurring.

In zone 3, the measured core experiences a high number of cache misses. This may correspond to a scenario in which transaction costs of retrieving cache misses may too great to be addressed through a prevention policy. In some embodiments, where a scheduler 114 requests a JMM count from a cache controller 118, and the cache controller provides a JMM count indicating and/or other data indicating total cache miss numbers, JMM counts, and/or dm/dt values indicating the measured core and/or task falls in zone 3, the scheduler 114 may for example be configured not to deploy a prevention policy, as any prevention policy may be futile when a zone 3 scenario occurs.

Figure 5:
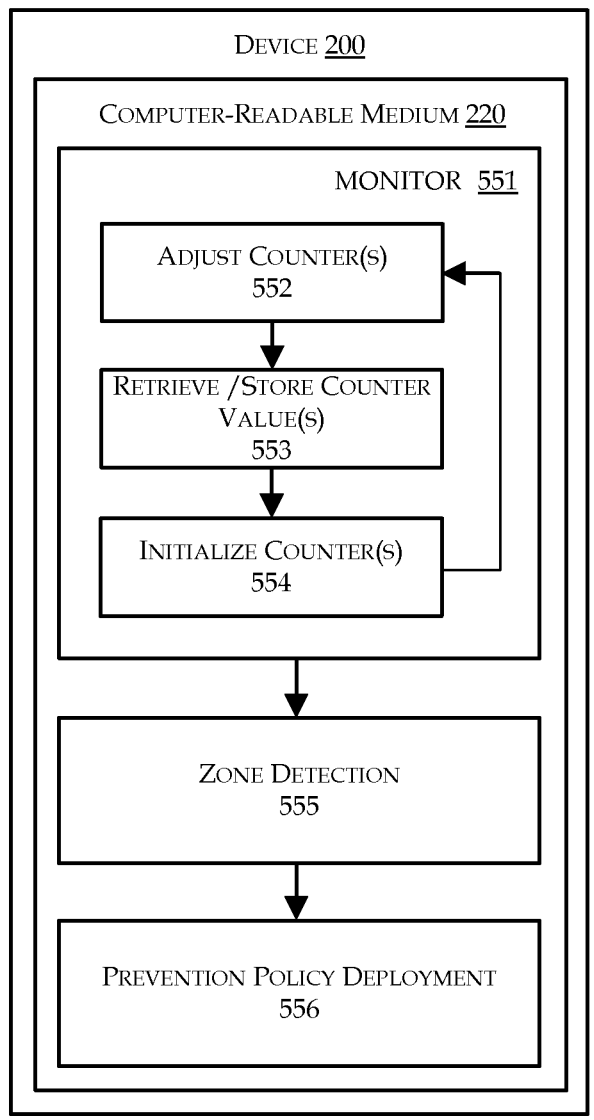
FIG. 5 is a flow diagram illustrating an example method that may implement cache use based adaptive scheduling in a device.

FIG. 5 is a flow diagram illustrating an example method that may implement cache use based adaptive scheduling in a device (e.g., device 200 introduced in FIG. 2) that is arranged in accordance with at least some embodiments of the present disclosure. The example flow diagram may include one or more operations/modules as illustrated by blocks 551-556, which represent operations as may be performed in a method, functional modules in a device 200, and/or instructions as may be recorded on a computer readable medium 220. The illustrated blocks 551-556 may be arranged to provide functional operations including one or more of "monitor" at block 551, "zone detection" at block 555, and/or "prevention policy deployment" at block 556. Block 551 is furthermore illustrated as comprising an "adjust counter(s)" block 552, a "retrieve/store counter values" block 553, and an "initialize counters" block 554.

In FIG. 5, block 551, 555, and 556 are illustrated as being performed sequentially, with block 551 first and block 556 last. Furthermore, within block 551, blocks 552, 553, and 554 are illustrated as being performed sequentially, with block 552 first and block 554 last. It will be appreciated however that these blocks may be re-ordered as convenient to suit particular embodiments, and that these block or portions thereof may be performed concurrently in some embodiments. It will also be appreciated that in some examples various block may be eliminated, divided into additional blocks, and/or combined with other blocks.

FIG. 5 illustrates an example method by which cache use data may be gathered and a prevention policy may be deployed in device 200 comprising a multicore environment 100. In general, blocks 551-556 may be carried out by components illustrated in at least FIG. 6, FIG. 7, and/or FIG. 8, as described further in connection with those figures below. The top-level blocks of FIG. 5 provide a monitor block 551 for monitoring cache use for example be retrieving JMM counts, a zone detection block 555 for detecting circumstances in which prevention policy deployment may be beneficial, and a prevention policy deployment block 556 for deploying a prevention policy that improves shared cache use in a multicore environment 100. The various blocks are described in further detail below.

In a "monitor" block 551, cores, tasks, and cache use data may be monitored, for example, by a scheduler 114 in conjunction with a cache controller 118. In some embodiments, a scheduler 114 may be configured to monitor a shared cache, cores, and tasks to determine if circumstances indicating likely shared cache use problems ("suspicious conditions") arise. For example, a scheduler 114 may be configured to monitor cores and tasks for introduction of certain task types such as decrypting and uncompressing large files, which tasks may be prone to shared cache problems. Scheduler 114 may also be configured to monitor cores for increased use of a main system memory or other non-cache memory locations. Scheduler 114 may also be configured to monitor a shared cache for balance between write and read operations. These and other suspicious conditions may be monitored by a scheduler 114 in some embodiments to determine if further investigation is worthwhile.

In some embodiments, block 551 may further comprise a scheduler 114 requesting a cache controller 118 for JMM counts associated with particular cores in the multicore environment. In various embodiments, requests for JMM counts may be done when a scheduler 114 determines that suspicious conditions are present. In some embodiments, requests for JMM counts may be routine and not subject to detection of suspicious conditions.

Blocks 552-554 may be involved in retrieving JMM counts. In an "adjust counters" block 552, a scheduler 114 may command a cache controller 118 to start one or more counters corresponding to one or more cores, and the counter may optionally reset and start the requested counters by initiating incrementing or decrementing one or more counters in response to JMMs, as appropriate for the embodiment. In a retrieve/store counter value(s) block 553, a scheduler 114 may command a cache controller 118 to provide counter values, requested counter values may be provided to the scheduler 114, and the scheduler may store retrieved counter values. The cache controller 118 may automatically reset the counters once the counter values are provided to the scheduler 114, or may allow the counters to continue counting without resetting in some embodiments. In a "initialize counters" block 554, the scheduler 114 may command the cache controller 118 to reset or otherwise initialize to a predetermined count value counters associated with cores identified by the scheduler 114, and the cache controller 118 may reset counters accordingly. Block 551 may be followed by block 555.

In a "zone detection" block 555, a scheduler 114, a component of a scheduler 114, or another module in cooperation with a scheduler 114 may be configured to detect whether shared cache use circumstances in a multicore environment are such that a prevention policy may be beneficially deployed to prevent a memory wall problem from arising. In some embodiments, block 555 may be configured to analyze stored JMM values corresponding to one or more cores. In some embodiments, block 555 may utilize core performance data beyond retrieved JMM counter values as discussed below in connection with FIG. 7. In some additional embodiments, block 555 may be configured to evaluate a number and/or rate (dm/dt) of JMM per unit of time and to compare the number and/or rate of JMM to values from a zone graph such as FIG. 4 to determine if JMM values indicate circumstances that may be characterized as in a particular zone, such as zone 2, in FIG. 4. In some embodiments, block 555 may compare retrieved JMM values to threshold JMM values described above in connection with FIG. 3. Block 555 may be configured to use these and any other techniques to determine if deploying a prevention policy may be beneficial under any particular circumstances encountered by block 555. Block 555 may be followed by block 556.

In a "prevention policy deployment" block 556, a prevention policy may be deployed to adapt and improve the use of a shared cache in a multicore environment 100 associated with device 200. A prevention policy may be any policy that adjusts relative execution rates of tasks accessing a shared cache. For example, potential memory wall problems may be prevented by slowing an execution rate of one or more producer tasks, by increasing an execution rate of one or more consumer tasks, or both.

In some embodiments, a prevention policy may be generated by a scheduler 114, and initially deployed to a cache controller 118. In some additional embodiments, the prevention policy may be deployed from scheduler 114 directly to one or more cores in the multicore environment 100. These embodiments are examples only and it will be recognized that a prevention policy may be formulated by or with the assistance of any aspect of a multicore environment and may be deployed using a wide variety of components and techniques, as desired to adjust relative execution rates of tasks using a shared cache. A prevention policy may for example use any of the techniques discussed herein, including but not limited to context switches, task throttling, cache policy adjustments, task priority adjustments, and available task resource adjustments.

Figure 6:
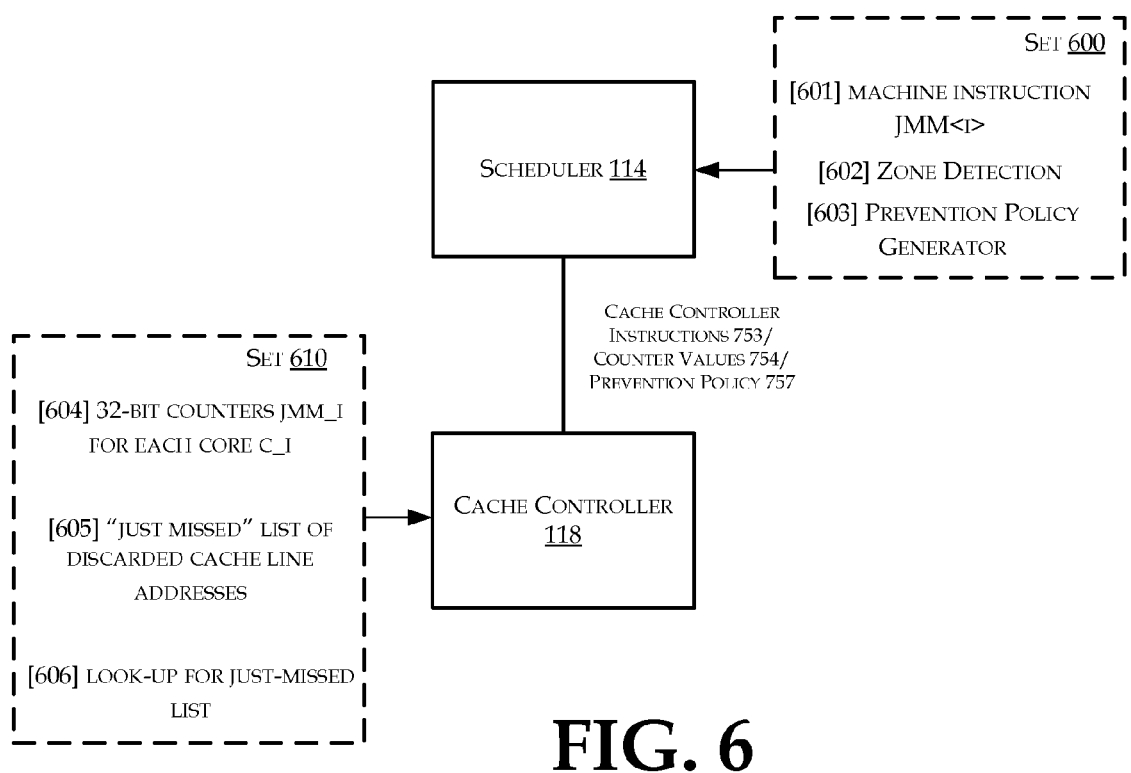
FIG. 6 is a block diagram illustrating example modifications as may be implemented in scheduler and cache controller components.

FIG. 6 is a block diagram illustrating example components as may be implemented in a scheduler and cache controller, arranged in accordance with at least some embodiments of the present disclosure. FIG. 6 illustrates a scheduler 114 and a cache controller 118. Scheduler 114 may for example include a set of components 600 comprising logic and/or processors configured to execute instructions to implement an "add machine instruction JMM<i>" component 601, an "add zone detection" component 602, and/or "add prevention policy generator" component 603. Cache controller may for example include a set of components 610 comprising logic and/or processors configured to execute instructions to implement an "add 32 bit counters JMM<i> for each core C_i" component 604, an "add 'just-missed' list of discarded cache line addresses" component 605, and/or an "add look-up for just-missed list" component 606.

Scheduler 114 and cache controller 118 may be coupled via bus and/or interface connections as described in connection with FIG. 2. Scheduler 114 and cache controller 118 may be configured to exchange data and/or commands comprising, for example, cache controller instructions 753, counter values 754, and/or prevention policy 757.

The scheduler 114 may be configured with component 601. When scheduler 114 executes the JMM<i> instruction, the multicore environment 100 may respond by providing a counter value corresponding to core <i> to the scheduler 114, and resetting the counter for core <i>. Scheduler 114 may then utilize components 602 and 603 to detect a need for a prevention policy and to initiate deployment of a prevention policy, respectively, as described above.

The cache controller 118 may be configured with component 604. Component 604 may add 32 bit counters such as 108, 110, 112, corresponding to each core in a multicore environment 100. The added counters may be configured to count JMM.

The cache controller 118 may be configured with component 605. Component 605 may comprise a "just missed" list of discarded cache line addresses. Component 605 may be configured for use in determining, by cache controller 118, if a cache miss should be characterized as a JMM for the purpose of incrementing a counter. Component 605 may also be used for other purposes, for example, component 605 may comprise pointers to data recently evicted from a shared cache. Component 605 may be used to revive pointers (and the data they are pointing to), such that when a measured task moves into zone 2, the priority of a task may be increased, and data referenced in modification 605 may be used to restore recently evicted data back to the shared cache.

The cache controller 118 may be configured with component 606. Component 606 may comprise a look-up table for the just missed list of component 605. Component 606 may be configured for use in determining, by cache controller 118, if a cache miss should be characterized as a JMM for the purpose of incrementing a counter.

Figure 7:
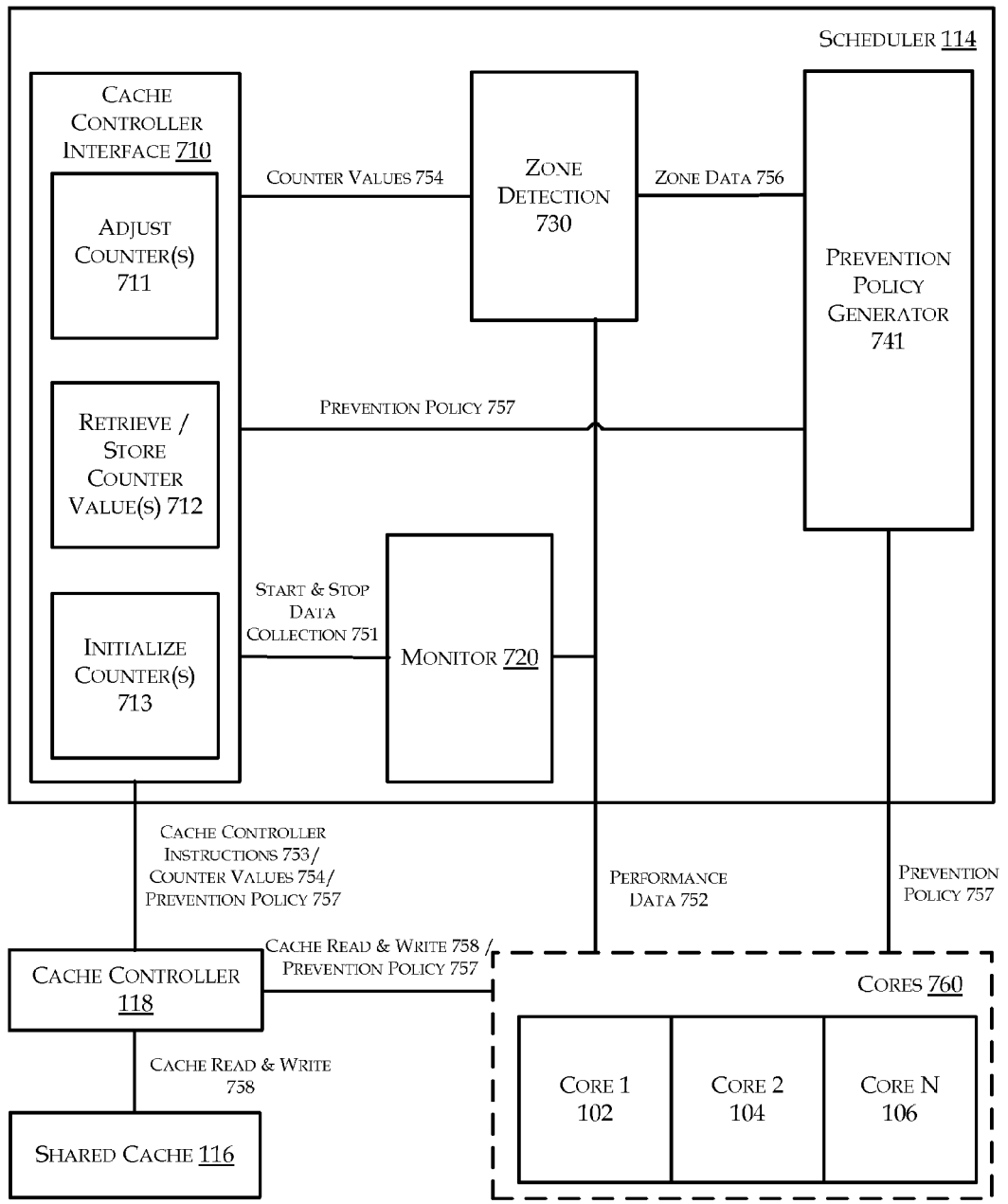
FIG. 7 is a block diagram illustrating an example scheduler configuration.

FIG. 7 is a block diagram illustrating an example scheduler configuration, arranged in accordance with at least some embodiments of the present disclosure. Example scheduler 114 may comprise, inter alia, a cache controller interface 710, zone detection 730, monitor 720, and prevention policy generator 741. Cache controller interface 710 may comprise an adjust counter(s) module 711, a retrieve/store counter value(s) module 712, and/or an initialize counter(s) module 713. FIG. 7 also illustrates cache controller 118, shared cache 116, and cores 760, each of which may be disposed outside of the scheduler 114. Cores 760 may comprise a plurality of N cores such as core 102 (Core 1), core 104 (Core 2) and core 106 (Core N).

In FIG. 7, the various couplings between components may be implemented via bus and interface connections as described in connection with FIG. 2. Monitor 720 and cores 760 may be configured to exchange data and/or commands comprising, for example, performance data 752. Performance data 752 may also be shared with zone detection 730. Monitor 720 and cache controller interface 710 may be configured to exchange data and/or commands comprising, for example, start and stop data collection 751. Cache controller interface 710 and zone detection 730 may be configured to exchange data and/or commands comprising, for example, counter values 754. Zone detection 730 and prevention policy generator 741 may be configured to exchange data and/or commands comprising, for example, zone data 756. Prevention policy generator 741 and cores 760 may be configured to exchange data and/or commands comprising, for example, prevention policy 757. Prevention policy generator 741 and cache controller interface 710 may be configured to exchange data and/or commands comprising, for example, prevention policy 757. Cache controller interface 710 and cache controller 118 may be configured to exchange data and/or commands comprising, for example, cache controller instructions 753, counter values 754, and/or prevention policy 757. Cache controller 118 and shared cache 116 may be configured to exchange data and/or commands comprising, for example, cache read and/or write data and/or commands 758. Cache controller 118 and cores 760 may be configured to exchange data and/or commands comprising, for example, cache read and/or write data and/or commands 758 and/or prevention policy 757.

In FIG. 7, cores 760 may ordinarily be configured to perform cache read and/or write operations 758 by communicating with cache controller 118, and the cache controller 118 may in turn be configured to perform cache read and/or write operations 758 with shared cache 116. As cores 760 may be using the cache controller 118 and shared cache 116 in this way, monitor 720 may be configured to detect suspicious conditions, for example by evaluating performance data 752 as discussed above in connection with FIG. 5.

Monitor 720 may be configured to provide start and stop data collection 751 commands to cache controller interface 710, for example to start monitoring JMM data when suspicious conditions exist and to stop monitoring JMM data when suspicious conditions no longer exist.

Cache controller interface 710 may be configured to perform data collection in response to commands 751. Cache controller interface 710 may be configured to employ components 711, 712, and/or 713 to collect JMM cache use data corresponding to cores in a multicore environment, which cores may be identified in commands 751. Thus, in some embodiments, all cores in a multicore environment need not be subject to JMM monitoring all of the time. Instead, particular cores for which suspicious conditions exist may be monitored on an as-needed basis. Cache controller interface 710 may be configured to send cache controller instructions 753 to the cache controller 118, instructing the cache controller 118 to count JMM for particular core(s) under investigation, e.g., cores associated with particular producer and/or consumer tasks. Cache controller interface 710 may also be configured to receive and store requested counter values 754 from the cache controller 118. Requested counter values may be stored in a table or other data structure allowing for comparing, sorting, averaging, summing, and/or other operations as may be needed for analysis of the data.

Zone detection 730 may be configured to access counter values 754 and may be configured to use counter values 754 to detect if conditions exist that warrant intervention, via a prevention policy, to preserve the effective use of the shared cache 116. Zone detection may for example be configured to compare JMM values to selected threshold values, to calculate and analyze dm/dt, and to use other data such as overall cache hit/miss data, as discussed herein, to determine if conditions exist that warrant a prevention policy. Moreover, in some embodiments zone detection may be configured to collect data to help identify what types of prevention policy may be warranted. For example, zone detection 730 may be configured to analyze performance data 752 as well as counter values 754. In some embodiments, zone detection 730 may be configured to detect whether mild, medium, or aggressive prevention policies are recommended. In some additional embodiments, zone detection 730 may be configured to detect which types of prevention measures, such as producer task throttling, increased execution rate of a consumer task, or both, may be recommended to alleviate risk of a shared cache memory wall.

Prevention policy generator 741 may be configured to generate a prevention policy 757 in response to a detection made by zone detection 730. A prevention policy 757 may apply to cores and/or tasks identified in the prevention policy 757. As discussed above, a prevention policy 757 may comprise any number of measures for adjusting relative execution rates of tasks using the shared cache 116. The prevention policy 757 may also be tailored to make mild, medium, or aggressive execution rate adjustments to appropriately respond to particular cache use scenarios. For example, a mild prevention policy 757 may make small adjustments to priorities of tasks using the shared cache 116, while an aggressive prevention policy 757 may make large adjustments to priorities of tasks. A prevention policy may be communicated to cache controller interface 710 for communication to the cache controller 757, which may in turn communicate and/or carry out the prevention policy 757 with respect to the cores 760. Alternatively, some or all aspects of a prevention policy 757 may be carried out via direct interaction between the prevention policy generator 741 and the cores 760.

Figure 8:
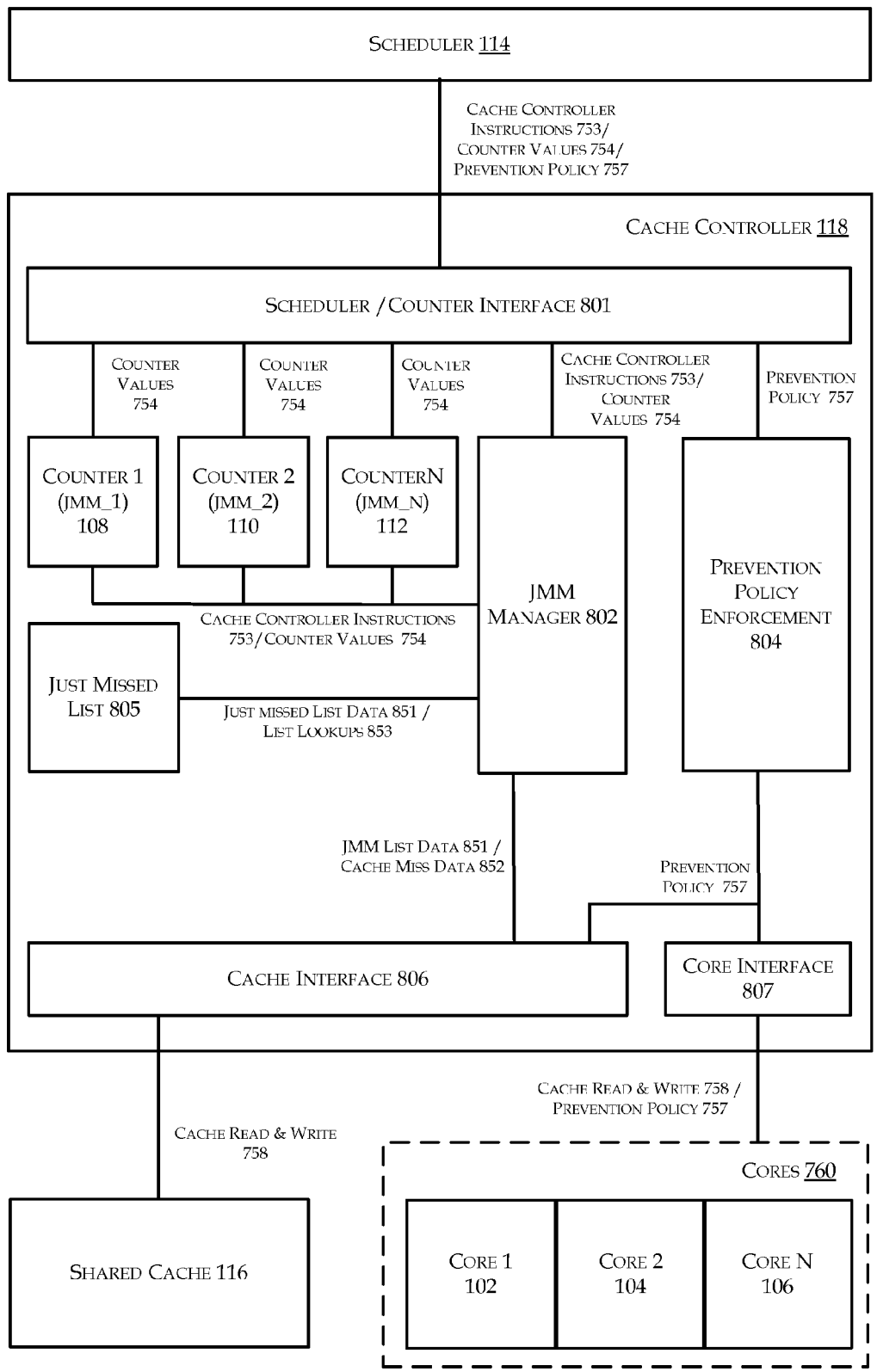
FIG. 8 is a block diagram illustrating an example cache controller configuration; all arranged in accordance with at least some embodiments of the present disclosure.

FIG. 8 is a block diagram illustrating an example cache controller configuration, arranged in accordance with at least some embodiments of the present disclosure. Example cache controller 118 may comprise, inter alia, a scheduler/counter interface 801, counters 108, 110, 112, a JMM manager 802, a just missed list 805, a prevention policy enforcement module 804, a cache interface 806, and/or a core interface 807. FIG. 8 also illustrates scheduler 114, shared cache 116, and cores 760, each of which may be disposed outside of the scheduler 114. Cores 760 may comprise a plurality of N cores such as core 102 (Core 1), core 104 (Core 2) and core 106 (Core N).

In FIG. 8, the various couplings between components may be implemented via bus and interface connections as described in connection with FIG. 2. Scheduler 114 and scheduler/counter interface 801 may exchange data and/or commands comprising, for example, cache controller instructions 753, counter values 754, and/or prevention policy 757. Scheduler/counter interface 801 and JMM manager 802 may be configured to exchange data and/or commands comprising, for example, cache controller instructions 753 and/or counter values 754. JMM manager 802 and counters 108, 110, 112, may be configured to exchange data and/or commands comprising, for example, cache controller instructions 753 and/or counter values 754. Counters 108, 110, 112 and scheduler/counter interface 801 may also be configured to exchange data and/or commands comprising, for example, counter values 754. JMM manager 802 and just missed list 805 may be configured to exchange data and/or commands comprising, for example, just missed list data 851 and/or list lookups 853. JMM manager 802 and cache interface 806 may be configured to exchange data and/or commands comprising, for example, just missed list data 851 and/or cache miss data 852. Cache interface 806 and shared cache 116 may be configured to exchange data and/or commands comprising, for example, cache read and/or write data and/or commands 758. Scheduler/counter interface 801 and prevention policy enforcement 804 may be configured to exchange data and/or commands comprising, for example, prevention policy 757. Prevention policy enforcement 804, core interface 807, and cache interface 806 may be configured to exchange data and/or commands comprising, for example, prevention policy 757. Cache interface 807 and cores 760 may be configured to exchange data and/or commands comprising, for example, cache read and/or write data and/or commands 758 and/or prevention policy 757.

In FIG. 8, as with FIG. 7, cores 760 may ordinarily be configured to perform cache read and/or write operations 758 by communicating with cache controller 118, and the cache controller 118 may in turn be configured to perform cache read and/or write operations 758 with shared cache 116.

Scheduler/counter interface 801 may be configured to receive cache controller instructions 753 instructing the cache controller 118 to start counting JMM corresponding to a core identified in the instructions 753, or to start counting JMM for all cores. Scheduler/counter interface 801 may be configured to provide instructions 753 to JMM manager, and to receive counter values 754 either from JMM manager 802 or from the various counters 108, 110, 112. Scheduler/counter interface 801 may be configured to provide counter values 754 to scheduler 114, either automatically or in response to a request from scheduler 114. Scheduler/counter interface 801 may also be configured to receive reset instruction(s) as a cache controller instruction 753 from scheduler 114 and to reset counters identified in such reset instruction(s) by providing the reset instruction(s) to JMM manager 802 or by direct interaction with one or more of the counters 108, 110, 112.

JMM manager 802 may be configured to receive cache controller instructions 753 from interface 801 and to provide the instructions 753 to one or more of counters 108, 110, 112 for example by starting, stopping, resetting, initializing and/or retrieving counter values 754 from one or more of the counters 108, 110, 112.

JMM manager 802 may also be configured to maintain the just-missed list 805 by placing just-missed list data 851 in the list 805. Just-missed list data 851 may comprise identifications of cache line addresses associated with data recently discarded from the shared cache 116. JMM manager 802 may for example be configured to receive just-missed list data 851 from cache interface 806 as data is discarded from the shared cache 116, and JMM manager 802 may be configured to place the data 851 in the list 805. The just-missed list as maintained by the JMM manager 802 may for example comprise a LIFO list of the last n/K discarded cache line addresses for an n-way associative cache, where K is a constant K>=2.

JMM manager 802 may also be configured to increment an appropriate counter from counters 108, 110, 112 when a JMM is identified. In some embodiments, JMM manager may receive cache miss data 852 from cache interface 806 upon occurrence of a cache miss. The cache miss data 852 may identify a core and/or task associated with a cache miss. JMM manager 802 may be configured to respond to the receipt of cache miss data 852 by determining if a cache line address associated with the cache miss is in the just missed list 805. If so, a JMM may have occurred and a counter corresponding to the core associated with the cache miss may be incremented. If not, no JMM may have occurred and no counter need be incremented.

JMM manager 802 may also be configured to maintain an associative lookup table for the data identified by cache line addresses in the just missed list 805. This allows the cache controller 118 to optionally use the list 805 to reinstate recently discarded data in the shared cache 116. Cache controller 118 may be configured to reinstate data in the shared cache for example in accordance with a received prevention policy 757, which may comprise, for example, an increased priority level of a task associated with the recently discarded data.

Scheduler/counter interface 801 may be configured to receive a prevention policy 757 and to provide the prevention policy 757 to prevention policy enforcement module 804. Prevention policy enforcement module 804 may be configured to enforce aspects of a prevention policy by communications with cores 760 via core interface 807, and may be configured to enforce aspects of a prevention policy by making adjustments at the cache interface 806.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A multicore computer system, comprising:
   a shared cache;
   a cache controller coupled to the shared cache and configured to maintain a just-missed list of cache line addresses associated with data recently discarded from the shared cache;
   wherein the cache controller comprises a plurality of counters, wherein each respective counter is associated with a respective core of the multicore computer system;
   wherein the cache controller is configured to increment counters associated with respective cores in response to cache misses by each respective core so as to count just-missed misses by each respective core, by identification, in response to cache misses, of a core associated with a cache miss and determination of whether a cache line address associated with the cache miss is in the just-missed list; and
   a scheduler coupled to the cache controller and configured to, in response to an increase in a rate of just-missed misses, wherein the rate of just-missed misses comprises just-missed misses per unit of time counted by a first counter, increase an execution rate of a task associated with a first core associated with the first counter relative to an execution rate of a task associated with a second core.

2. The multicore computer system of claim 1, wherein the cache controller is configured to initialize one or more of the counters in response to a command from the scheduler.

3. The multicore computer system of claim 2, wherein the cache controller is configured to provide counter values to the scheduler in response to at least one request by the scheduler.

4. The multicore computer system of claim 1, wherein the scheduler is configured to increase the execution rate of the task associated with the first core relative to the execution rate of the task associated with the second core via a policy provided to the cache controller.

5. The multicore computer system of claim 1, wherein the just-missed list comprises a last in first out (LIFO) list of the last n/K discarded cache line addresses for an n-way associative cache, where K is a constant K>=2.

6. The multicore computer system of claim 1, wherein the task associated with the second core comprises a producer task and wherein the task associated with the first core comprises a consumer task, and wherein the consumer task is adapted to read data placed in the shared cache by the producer task.

7. The multicore computer system of claim 6, wherein the consumer task is adapted to uncompress data which is decrypted and placed in the shared cache by the producer task.

8. The multicore computer system of claim 1, wherein the shared cache comprises a ring buffer level two (L2) or level three (L3) cache.

9. The multicore computer system of claim 1, wherein the cache controller is configured to maintain an associative lookup table for data identified by cache line addresses in the just-missed list.

10. A method to operate a multicore computer system that uses a shared cache, the method comprising:
  maintaining, by a cache controller, a just-missed list of cache line addresses associated with data recently discarded from the shared cache;
  identifying, by the cache controller, in response to a cache miss, a first core associated with the cache miss;
  determining, by the cache controller, whether a cache line address associated with the cache miss is in the just-missed list;
  incrementing, by the cache controller, a counter for the first core associated with the cache miss in response to determination that the cache line address associated with the cache miss is in the just-missed list, so as to accumulate, by the counter for the first core, counts of shared cache just-missed misses by the first core, wherein the just-missed misses include cache misses associated with data recently evicted from the shared cache;
  wherein the cache controller comprises a plurality of counters, wherein each respective counter is associated with a respective core of the multicore computer system, and wherein the cache controller is configured to increment counters associated with respective cores in response to cache misses by each respective core so as to count just-missed misses by each respective core, by identification, in response to cache misses, of a core associated with a cache miss and determination of whether a cache line address associated with the cache miss is in the just-missed list;
  receiving, by a scheduler, counts associated with the counter for the first core;
  detecting, by the scheduler, an increase in a rate of just-missed misses, wherein the rate of just-missed misses comprises just-missed misses per unit of time associated with the first core based at least in part on the counts received by the scheduler; and
  increasing, by the scheduler in response to detecting the increase in the rate of just-missed misses associated with the first core, an execution rate of a task associated with the first core relative to an execution rate of a task associated with a second core.

11. The method of claim 10, further comprising initiating, by the scheduler, the counter for the first core by requesting the cache controller to start the counter for the first core.

12. The method of claim 10, wherein increasing the execution rate of the task associated with the first core relative to the execution rate of the task associated with the second core comprises providing a policy to the cache controller.

13. A method to operate a multicore computer system that uses a shared cache and that includes a first core and a second core, the method comprising:
  receiving, by a cache controller, a request to count shared cache just-missed misses associated with the first core, wherein the just-missed misses include cache misses associated with data recently evicted from the shared cache;
  counting, by the cache controller, the shared cache just-missed misses associated with the first core, wherein counting the shared cache just-missed misses comprises:
    maintaining, by the cache controller, a just-missed list of cache line addresses associated with data recently evicted from the shared cache;
    identifying, by the cache controller, in response to a cache miss, that the first core is associated with the cache miss;
    determining, by the cache controller, whether a cache line address associated with the cache miss is in the just-missed list; and
    incrementing, by the cache controller, a counter for the first core in response to determination that the cache line address associated with the cache miss is in the just-missed list, wherein the cache controller comprises a plurality of counters, wherein each respective counter is associated with a respective core of the multicore computer system, and wherein the cache controller is configured to increment counters associated with respective cores in response to cache misses by each respective core so as to count just-missed misses by each respective core, by identification, in response to cache misses, of a core associated with a cache miss and determination of whether a cache line address associated with the cache miss is in the just-missed list; and
  providing counts of shared cache just-missed misses associated with the first core to a scheduler so as to enable the scheduler to increase an execution rate of a task associated with the first core relative to an execution rate of a task associated with a second core in response to an increase in a rate of just-missed misses, wherein the rate of just-missed misses comprises just-missed misses per unit of time associated with the first core.

14. The method of claim 13, wherein to increase the execution rate of the task associated with the first core, the scheduler generates a cache usage policy.

15. A method to operate a multicore computing system that uses a shared cache and that includes a first core and a second core, the method comprising:
  counting just-missed misses for a plurality of cores of the multicore computing system by incrementing a plurality of counters, wherein each respective counter is associated with a respective core of the multicore computer system, and wherein counters associated with respective cores are incremented in response to cache misses by each respective core so as to count just-missed misses by each respective core, by identification, in response to cache misses, of a core associated with a cache miss;
  monitoring a rate of shared cache just-missed misses, wherein the rate of just-missed misses comprises just-missed misses per unit of time associated with the first core;
  determining that the rate of just-missed misses associated with the first core has entered a particular range; and
  in response to determination that the rate of just-missed misses has entered the particular range, adjusting an execution rate of a first task associated with the first core relative to an execution rate of a second task associated with the second core.

16. The method of claim 15, further comprising maintaining a list of cache line addresses associated with data recently evicted from the shared cache and using the list in counting the just-missed misses.

17. The method of claim 15, further comprising providing a counter value to a scheduler in response to request by the scheduler.

18. The method of claim 15, further comprising increasing the execution rate of the first task relative to the execution rate of the second task based on a policy generated by a scheduler.

19. The method of claim 15, wherein adjusting the execution rate of the first task includes increasing the execution rate of the first task relative to the execution rate of the second task by one or more of providing a policy to a cache controller, throttling the second task, or initiating a context switch.

20. The method of claim 15, wherein the particular range comprises a second zone having rates of just-missed misses which fall between rates of just-missed misses in a first zone in which the first core experiences mostly cache hits, and rates of just-missed misses in a third zone in which the first core experiences a number of cache misses which is too large to be addressed by the adjustment of the execution rate of the first task relative to the execution rate of the second task.

21. A non-transitory computer readable medium that includes computer executable instructions stored thereon to manage use of a shared cache in a multicore computer system comprising a first core and a second core, the computer executable instructions comprising:

at least one computer executable instruction to count just-missed misses for a plurality of cores of the multicore computing system by incrementing a plurality of counters, wherein each respective counter is associated with a respective core of the multicore computer system, and wherein counters associated with respective cores are incremented in response to cache misses by each respective core so as to count just-missed misses by each respective core, by identification, in response to cache misses, of a core associated with a cache miss;

at least one computer executable instruction to monitor a rate of shared cache just-missed misses, wherein the rate of just-missed misses comprises just-missed misses per unit of time associated with the first core;

at least one computer executable instruction to determine that the monitored rate of shared cache just-missed misses is in a particular range; and at least one computer executable instruction to adjust an execution rate of a first task associated with the first core relative to an execution rate of a second task associated with the second core, in response to the monitored rate of just-missed misses being determined to be in the particular range.

22. The non-transitory computer readable medium of claim 21, further comprising at least one computer executable instruction stored thereon to maintain a list of cache line addresses associated with data recently evicted from the shared cache and to use the list to count the just-missed misses.

23. The non-transitory computer readable medium of claim 21, further comprising at least one computer executable instruction to provide a counter value to a scheduler in response to a request by the scheduler.

24. The non-transitory computer readable medium of claim 21, wherein the at least one computer executable instruction to adjust the execution rate includes at least one computer executable instruction to increase the execution rate of the first task relative to the execution rate of the second task in response to a policy received from a scheduler.

25. The non-transitory computer readable medium of claim 21, wherein the at least one computer executable instruction to adjust the execution rate includes at least one computer executable instruction to adjust the execution rate of the first task relative to the execution rate of the second task by one or more of providing a policy to a cache controller, throttling the second task, or initiating a context switch.

* * * * *

UNITED STATES PATENT AND TRADEMARK OFFICE
CERTIFICATE OF CORRECTION

PATENT NO. : 9,053,029 B2  Page 1 of 1
APPLICATION NO. : 13/702547
DATED : June 9, 2015
INVENTOR(S) : Roy et al.

It is certified that error appears in the above-identified patent and that said Letters Patent is hereby corrected as shown below:

On the Title Page, in item (75), under "Inventors", in Column 1, Line 2, delete "Soumya Datta, Kolkata, IN (US)" and insert -- Soumya Datta, Kolkata, IN --, therefor.

On the Title Page, in item (73), under "Assignee", in Column 1, Line 3, delete "EMPIRE TECHNOLOGY DEVELOPMENT LLC, Wilmington, DC (US)" and insert -- EMPIRE TECHNOLOGY DEVELOPMENT LLC, Wilmington, DE (US) --, therefor.

In the Specification

In Column 1, Line 9, delete "35 U.S.C. §371" and insert -- 35 U.S.C. § 371 --, therefor.

In Column 7, Line 44, delete "AN ports 263." and insert -- A/V ports 263. --, therefor.

Signed and Sealed this
Twenty-second Day of December, 2015

Michelle K. Lee
*Director of the United States Patent and Trademark Office*